US011257044B2

(12) United States Patent
Carver (10) Patent No.: US 11,257,044 B2
(45) Date of Patent: Feb. 22, 2022

(54) AUTOMATIC ASSOCIATION AND SHARING OF PHOTOS WITH CALENDAR EVENTS

(71) Applicant: MICROSOFT TECHNOLOGY LICENSING, LLC, Redmond, WA (US)

(72) Inventor: Brian T. Carver, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 758 days.

(21) Appl. No.: 15/627,584

(22) Filed: Jun. 20, 2017

(65) Prior Publication Data

US 2018/0365654 A1 Dec. 20, 2018

(51) Int. Cl.
| | |
|---|---|
| *G06Q 10/00* | (2012.01) |
| *G06Q 10/10* | (2012.01) |
| *G06K 9/00* | (2022.01) |
| *G06F 16/58* | (2019.01) |
| *G06Q 50/00* | (2012.01) |

(52) U.S. Cl.
CPC ......... *G06Q 10/1095* (2013.01); *G06F 16/58* (2019.01); *G06K 9/00288* (2013.01); *G06Q 10/109* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 6,108,640 | A * | 8/2000 | Slotznick | G06Q 30/06 705/7.18 |
| 6,606,411 | B1 * | 8/2003 | Loui | G06K 9/00624 382/224 |
| 8,358,358 | B2 * | 1/2013 | Gallagher | G06F 16/58 348/231.5 |
| 8,805,124 | B2 | 8/2014 | Cohen et al. | |
| 8,824,748 | B2 * | 9/2014 | Tseng | G06F 16/435 382/118 |
| 8,930,820 | B1 | 1/2015 | Elwell et al. | |

(Continued)

OTHER PUBLICATIONS

US 10,586,146 B2, 03/2020, Whritenor (withdrawn)*

(Continued)

*Primary Examiner* — Gurkanwaljit Singh
(74) *Attorney, Agent, or Firm* — Michael Best & Friedrich LLP (57) ABSTRACT

Technologies are described for automatic association and sharing of photos with calendar events. For example, photos or similar material associated with a calendar event may be determined and searched for through a variety of resources such as enterprise databases, personal data stores, cloud resources, or even the Internet based on an attribute of each photo and an attribute of the calendar event. Candidate photos resulting from the search may be presented to a user such as an organizer of a meeting or person setting an appointment for confirmation and selection. Upon receiving selection and confirmation of one or more photos from the candidate photos, the one or more photos may be made available to a group of users within a context of the calendar event. Various sharing options such as email, shared cloud storage, or calendar event itself may be used for sharing the photos.

19 Claims, 11 Drawing Sheets

(56) References Cited

U.S. PATENT DOCUMENTS

| | | | |
|---|---|---|---|
| 8,947,547 B1* | 2/2015 | Millikan | H04N 1/00156 348/211.1 |
| 8,965,409 B2* | 2/2015 | Abhyanker | G06Q 30/02 455/456.3 |
| 9,049,388 B2* | 6/2015 | Gallagher | G06F 16/58 |
| 9,185,063 B1 | 11/2015 | Kumar | |
| 9,336,553 B2* | 5/2016 | Rubinstein | G06Q 50/01 |
| 9,338,242 B1* | 5/2016 | Suchland | G06Q 30/02 |
| 9,405,774 B2 | 8/2016 | Charania et al. | |
| 9,892,203 B2* | 2/2018 | Houston | G06F 16/958 |
| 10,051,103 B1* | 8/2018 | Gordon | G06F 21/36 |
| 10,142,795 B2* | 11/2018 | Colosky | H04L 67/306 |
| 10,284,537 B2* | 5/2019 | Liu | G06F 16/683 |
| 10,476,827 B2* | 11/2019 | Lieb | G06T 3/40 |
| 2004/0075752 A1* | 4/2004 | Valleriano | H04N 5/772 348/231.3 |
| 2007/0008321 A1* | 1/2007 | Gallagher | G06F 16/2477 345/473 |
| 2008/0065974 A1* | 3/2008 | Campbell | G06Q 10/107 715/200 |
| 2009/0254614 A1* | 10/2009 | Brush | G06Q 10/10 709/204 |
| 2012/0166964 A1* | 6/2012 | Tseng | G06F 3/048 715/745 |
| 2012/0196581 A1* | 8/2012 | Papakipos | H04M 3/42042 455/415 |
| 2012/0254785 A1 | 10/2012 | Nakajo | |
| 2013/0066963 A1* | 3/2013 | Odio | H04L 65/403 709/204 |
| 2013/0066964 A1* | 3/2013 | Odio | G06Q 50/01 709/204 |
| 2013/0073371 A1* | 3/2013 | Bosworth | G06Q 30/02 705/14.35 |
| 2013/0095801 A1* | 4/2013 | Kermoian | H04M 1/724 455/414.1 |
| 2013/0097238 A1* | 4/2013 | Rogers | H04L 67/141 709/204 |
| 2014/0122471 A1* | 5/2014 | Houston | G06F 16/958 707/731 |
| 2014/0172876 A1* | 6/2014 | Rubinstein | G06F 16/9535 707/748 |
| 2014/0258297 A1* | 9/2014 | Davari | G06F 16/58 707/737 |
| 2014/0358613 A1* | 12/2014 | Libin | G06Q 10/1095 705/7.19 |
| 2015/0081369 A1 | 3/2015 | Sarrazin et al. | |
| 2016/0255139 A1* | 9/2016 | Rathod | H04L 51/046 709/203 |
| 2016/0267176 A1 | 9/2016 | Chi | |
| 2016/0269341 A1 | 9/2016 | Kumar et al. | |
| 2016/0360160 A1* | 12/2016 | Eizenberg | G06F 16/5866 |
| 2017/0139927 A1 | 5/2017 | Bendig et al. | |
| 2018/0032997 A1* | 2/2018 | Gordon | G06Q 30/0269 |
| 2018/0196880 A1* | 7/2018 | Carter | G06F 16/9535 |

OTHER PUBLICATIONS

Satish, A. (2013). Discovering real world context to tag personal photos (Order No. 3597849). Available from ProQuest Dissertations and Theses Professional. (Year: 2013).*

System and Method for Imposing Picture Constraints for Face-to-Face Meetings. The ip.com Journal. Dec. 3, 2010 (Year: 2010).*

X. Wang, S. Mamadgi, A. Thekdi, A. Kelliher and H. Sundaram, "Eventory—An Event Based Media Repository," International Conference on Semantic Computing (ICSC 2007), 2007, pp. 95-104, doi: 10.1109/ICSC.2007.70. (Year: 2007).*

A Calendar & Scheduling Computer Application Sub-System that incorporates a naturally expanding and correcting process of event invitations. The ip.com Journal. May 26, 2008. IBM (Year: 2008).*

W. Liu, Z. Zheng, G. Pan and S. Li, "SoPhoNet: Photo Sharing Based on Participatory Sensing," 2011 International Conference on Internet of Things and 4th International Conference on Cyber, Physical and Social Computing, 2011, pp. 217-224, doi: 10.1109/iThings/CPSCom.2011.119. (Year: 2011).*

Darbyshire, et al., "Getting Started with Google Apps", In Publication of Apress, May 25, 2010, 340 Pages.

Karch, Marziah, "Android for Work: Productivity for Professionals", In Publication of Apress, Sep. 1, 2010, 307 Pages.

"International Search Report and Written Opinion Issued in PCT Application No. PCT/US2018/033998", dated Oct. 17, 2018, 12 Pages.

"Mobile Web", Retrieved from: <<https://en.wikipedia.org/w/index.php?title=Mobile_Web&oldid=786099018>>, Jun. 17, 2017, 6 Pages.

Rahman, Mishaal, "Tasker Pro: Tag New Photos with the Current Calendar Even", https://www.xda-developers.com/tasker-pro-tag-new-photos-with-the-current-calendar-event/, Published on: May 30, 2016, 8 pages.

Esposito, Emily, "The Easiest Way to Make a Calendar in Excel", https://www.smartsheet.com/blog/easiest-way-make-calendar-excel, Published on: Apr. 29, 2015, 29 pages.

"Office Action Issued in European Patent Application No. 18770120.6", dated Sep. 28, 2020, 8 Pages.

"Summons to Attend Oral Proceedings Issued in European Patent Application No. 18770120.6", dated Feb. 11, 2021, 11 Pages.

* cited by examiner

AUTOMATIC ASSOCIATION AND SHARING OF PHOTOS WITH CALENDAR EVENTS

BACKGROUND

Calendar applications have become much more than a scheduling tool. Modern calendar applications provide a multi-functional platform for organizing and facilitating appointments, tasks, online or physical meetings, etc. As such, an increasing number of functionalities and features are provided by calendar applications. For example, calendar events provide, in addition to subject, timing, participant, location information, interactive elements to initiate online meetings, store material associated with the calendar event, etc. For example, documents and other content associated with a meeting or appointment may be stored and made available through the calendar event associated with the meeting or appointment. However, such material is manually retrieved or obtained and saved in the calendar event by a user in conventional systems.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automatic association and sharing of photos with calendar events. In some examples, a search may be performed through one or more resources for photos associated with a calendar event based on an attribute of each photo and an attribute of the calendar event. Candidate photos may be presented to a user for confirmation and selection. Upon receiving selection and confirmation of one or more photos from the candidate photos, the one or more photos may be made available to a group of users within a context of the calendar event.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, embodiments are directed to automatic association and sharing of photos with calendar events. For example, photos or similar material associated with a calendar event may be determined and searched for through a variety of resources such as enterprise databases, personal data stores, cloud resources, or even the Internet based on an attribute of each photo and an attribute of the calendar event. Candidate photos resulting from the search may be presented to a user such as an organizer of a meeting or person setting an appointment for confirmation and selection. Upon receiving selection and confirmation of one or more photos from the candidate photos, the one or more photos may be made available to a group of users within a context of the calendar event. Various sharing options such as email, shared cloud storage, or calendar event itself may be used for sharing the photos.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable mentors device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for automatic association and sharing of photos with calendar events. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1A:
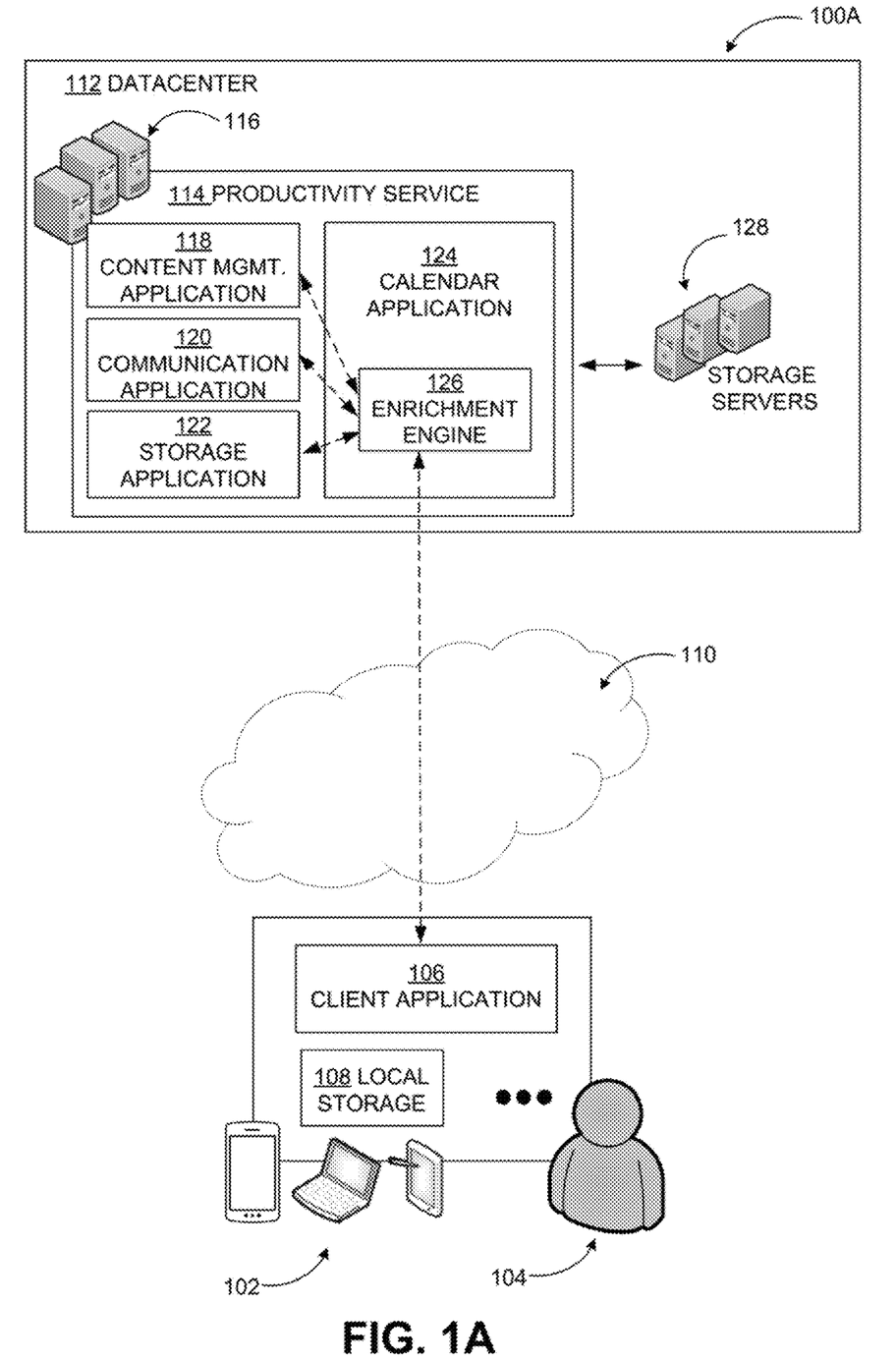
FIGS. 1A through 1C include display diagrams illustrating an example network environment where a system for automatic association and sharing of photos with calendar events may be implemented.
Figure 1B:
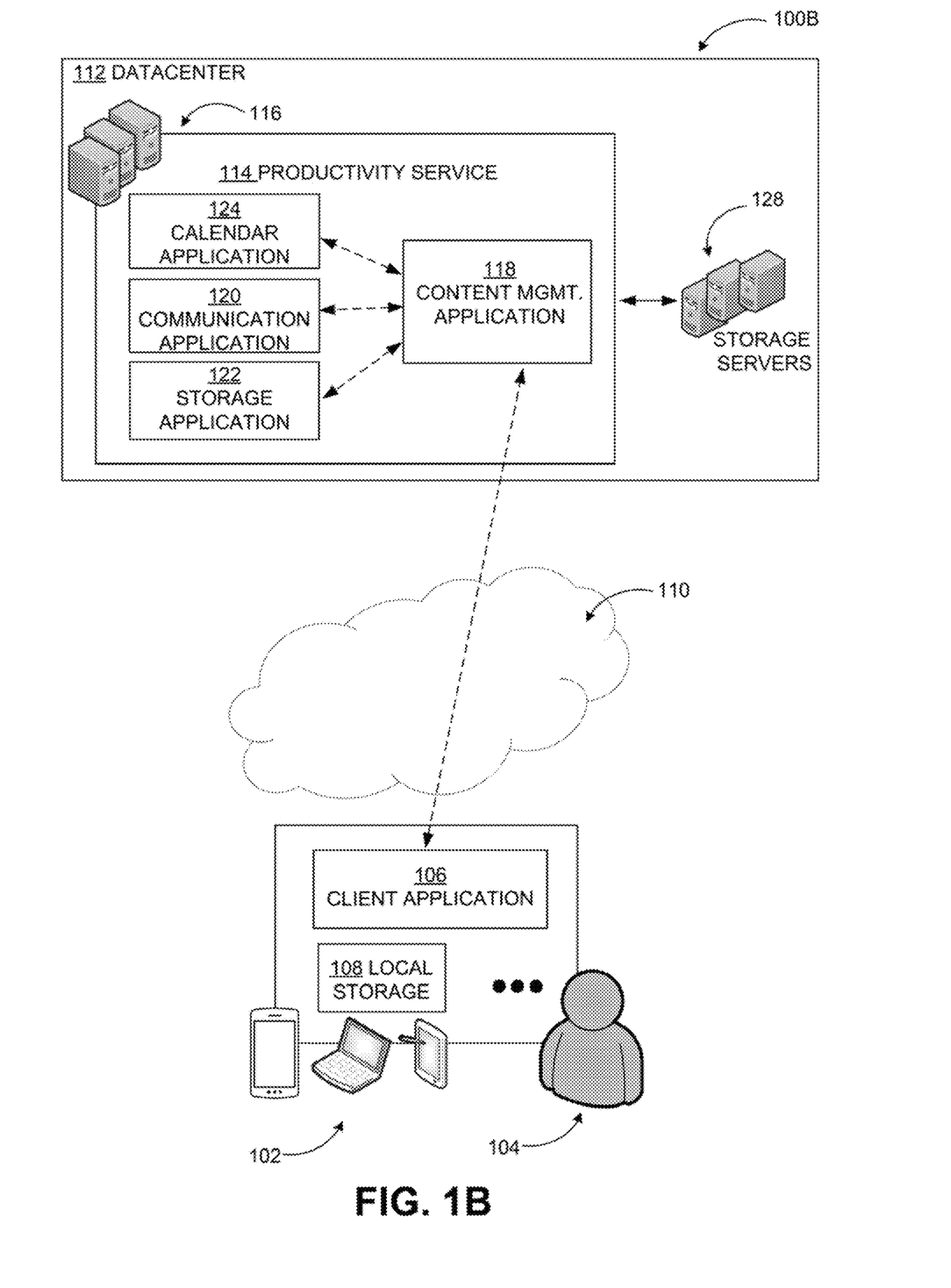
Figure 1C:
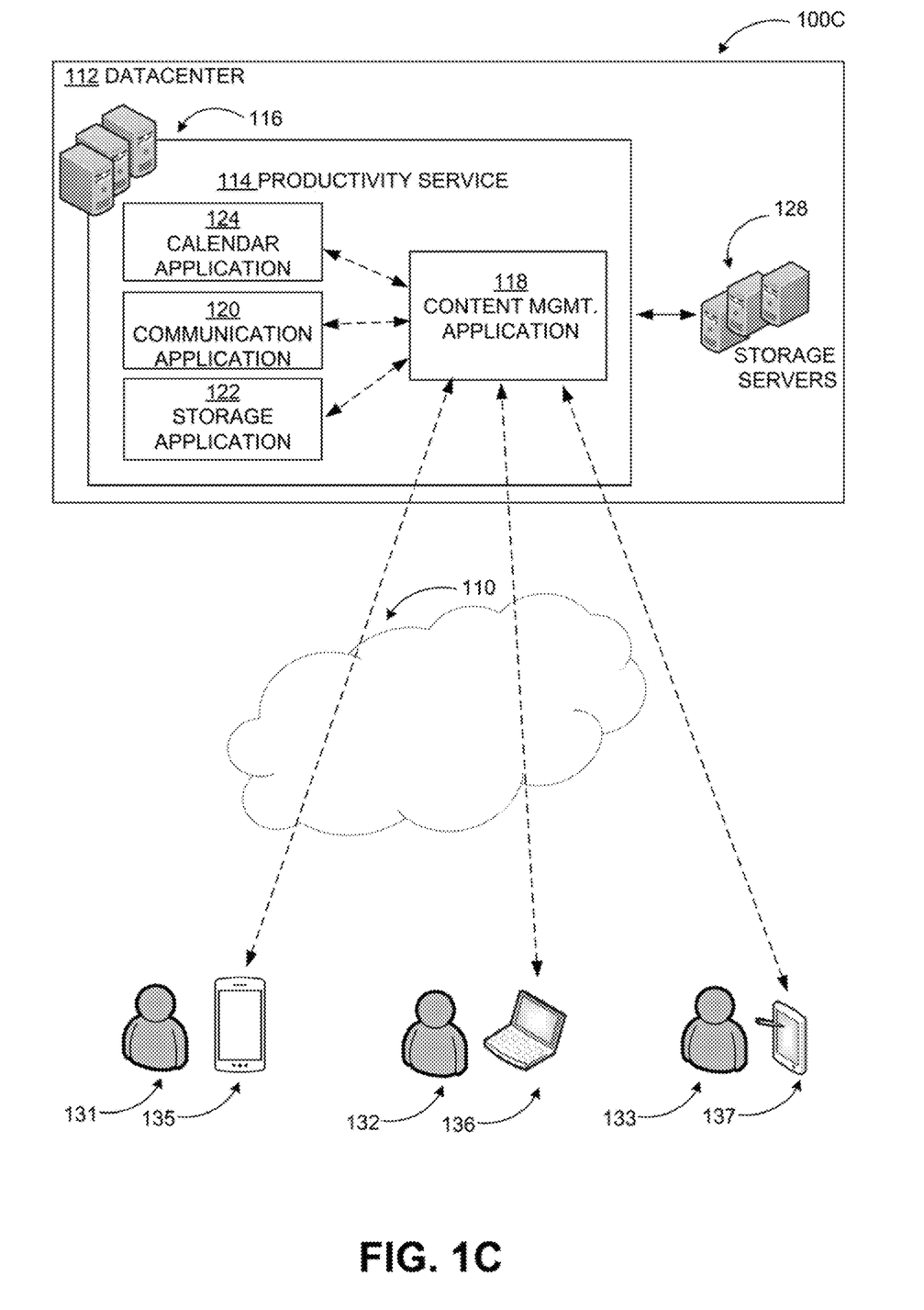

FIGS. 1A through 1C include display diagrams illustrating an example network environment where a system for automatic association and sharing of photos with calendar events may be implemented.

As illustrated in diagrams 100A through 100C, an example system may include a datacenter 112 executing a productivity service 114 on at least one processing server 116. The productivity service 114 may provide users various services and/or applications, including a content management application 118, a communication application 120, a storage application 122, and a calendar application 124, among other similar applications (e.g., word-processing, presentation, spreadsheet, and notebook applications), that enable users create, edit, manage, store, and share information. The productivity service 114 may be configured to interoperate with a client application 106 through one or more client devices 102 over one or more networks, such as network 110. For example, the productivity service 114 may allow a user 104 to access its services and/or applications through the client application 106 executed on the client devices 102. The client devices 102 may include a desktop computer, a laptop computer, a tablet computer, a vehicle-mount computer, a smart phone, or a wearable computing device, among other similar devices. In other examples, the productivity service 114 may be provided to a tenant (e.g., a business, an organization, or similar entities), which may configure and manage the services for their users. The information that is created, edited, stored, and/or shared using the various services and/or applications of the productivity service 114 may be stored locally in local storage 108 the client devices 102 and/or remotely in storage servers 128 of the datacenter 112 (or another datacenter).

In one embodiment, as illustrated in diagram 100A of FIG. 1A, the processing server 116 may be operable to execute an enrichment engine 126 to provide automatic association and sharing of photos with calendar events, where the enrichment engine 126 may be integrated with the calendar application 124 of the productivity service 114. In another embodiment, as illustrated in diagram 100B of FIG. 1B, the content management application 118 may provide automatic association and sharing of photos with calendar events in conjunction with other applications provided by the productivity service, including the calendar application 118, the communication application 120, and the storage application 122, for example.

In a further embodiment, as illustrated in diagram 100C of FIG. 1C, the content management application 118 may be configured to search through one or more resources for photos associated with a calendar event based on an attribute of each photo and an attribute of the calendar event. The resources may include the storage servers 128, data storage associated with one or more of the calendar application 118, the communication application 120, and the storage application 122, as well as, local storage of client devices 135, 136, and 137 associated with users 131, 132, and 133. Candidate photos may be presented to one of the users 131, 132, and 133 for confirmation and selection. Upon receiving selection and confirmation of one or more photos from the candidate photos, the content management application 118 may make the one or more photos available to a group of users such as users 131, 132, and 133 within a context of the calendar event. As described herein, the productivity service 114, the various applications provided by the productivity service 114, and the enrichment engine 126 may be implemented as software, hardware, or combinations thereof.

The selection and/or confirmation input may be received through one or more input devices communicatively coupled with one of the client devices 135, 136, and 137. The input devices may enable a keyboard input, a mouse input, a pen input, a touch input, an optical capture, a voice input, a gyroscopic input, and/or an eye-tracking input, for example.

Enriching calendar events with content such as video, audio, images, and graphics manually may be cumbersome and result in overuse of network, memory, and processing resources. Embodiments are directed to automatic association and sharing of content with calendar events. The implementation of automatic association and sharing of content with calendar events may increase user efficiency useful content for calendar events such as photos, graphics, or video for a meeting or appointment may prevent unnecessary delays in obtaining those during the meeting or appointment. In some cases, the content may be retrieved and associated with the calendar event after the fact allowing a complete record for the calendar event (e.g., pictures of whiteboard writings of a meeting). Thus, embodiments may also reduce memory, network bandwidth, and processor usage by reducing multiple after the fact or pre-event searches and individual distributions.

Embodiments, as described herein, address a need that arises from a very large scale of operations created by software-based services that cannot be managed by humans. The actions/operations described herein are not a mere use of a computer, but address results of a system that is a direct consequence of software used as a service offered in conjunction with a large number of users consuming productivity services to schedule, manage, and facilitate calendar events.

Some embodiments are described using photos as an illustrative example herein. However, embodiments are not limited to photos. Any applicable content, for example, video, audio, graphics, and comparable ones may be processed for automatic association and sharing in conjunction with a calendar event using the principles discussed herein. Calendar events may include, but are not limited to, online or physical meetings, appointments, tasks, etc.

Figure 2:
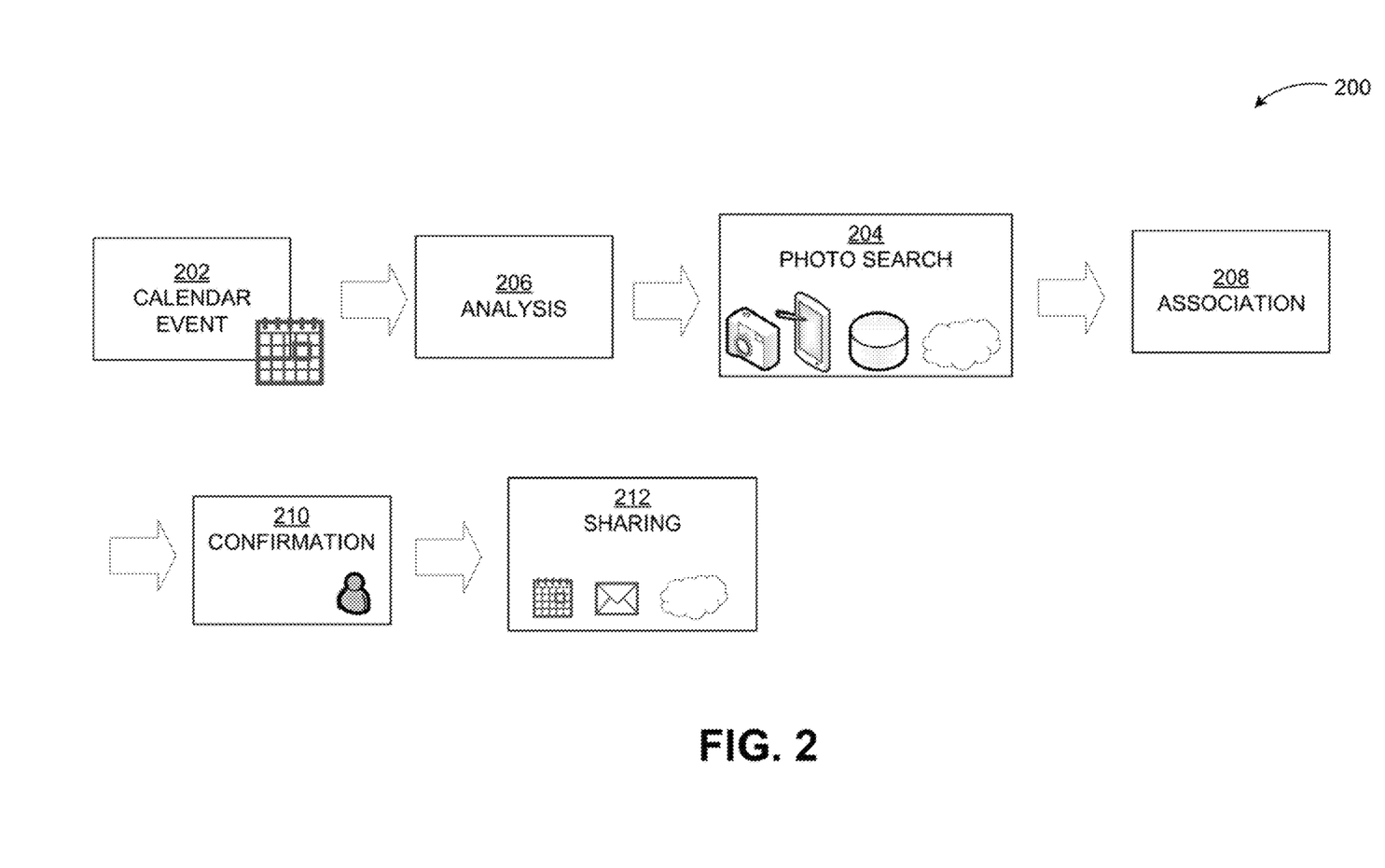
FIG. 2 includes a display diagram illustrating conceptually an example set of actions and components for automatic association and sharing of photos with calendar events.

FIG. 2 includes a display diagram illustrating conceptually an example set of actions and components for automatic association and sharing of photos with calendar events.

As shown in diagram 200, an example process may begin with a calendar event 202 such as a meeting, an appointment, or a task. A calendar application, a content management application, or a comparable application or module may analyze the calendar event 202 for its attributes. The attribute of the calendar event may include a type of the calendar event, a location of the calendar event, a date of the calendar event, a time of the calendar event, a number of participants of the calendar event, and/or an identity of the participants of the calendar event.

A search for photos 204 (and subsequent sharing) may occur while the calendar event 202 is being created (e.g., organizer is setting up a meeting) or after the fact. For example, the calendar application may process one or more existing calendar events automatically or upon request by a user, and find/share photos or other content associated with the existing calendar events. The search may compare the attributes of the calendar event 206 to attributes of the photos or other content to associate (208) the photos from different resources to the calendar event 202.

Candidate photos (or other content) found by the search 204 may be presented to a user for confirmation 210 (and/or selection). Upon receiving the user's confirmation/selection, the photos (or other content) may be shared (212) with other users through a variety of means. In some examples, as part of the selection/confirmation, the calendar application may present an option to select a sharing method for the photos to a user. Example sharing methods may include transmitting an email, transmitting a text message, providing a shared cloud storage location, and/or saving the photos in the calendar event. The resources from which the photos may be retrieved may include a cloud storage, an enterprise storage, a local storage associated with the user, or a photo capture device associated with the user. In some examples, users may give permission to the system to access certain content (e.g., photos captured in a meeting room or photos captured during work hours, etc.). The calendar application or a search engine employed by the calendar application may then search through those users' devices (computer, photo capture device, etc.) as well.

Figure 3:
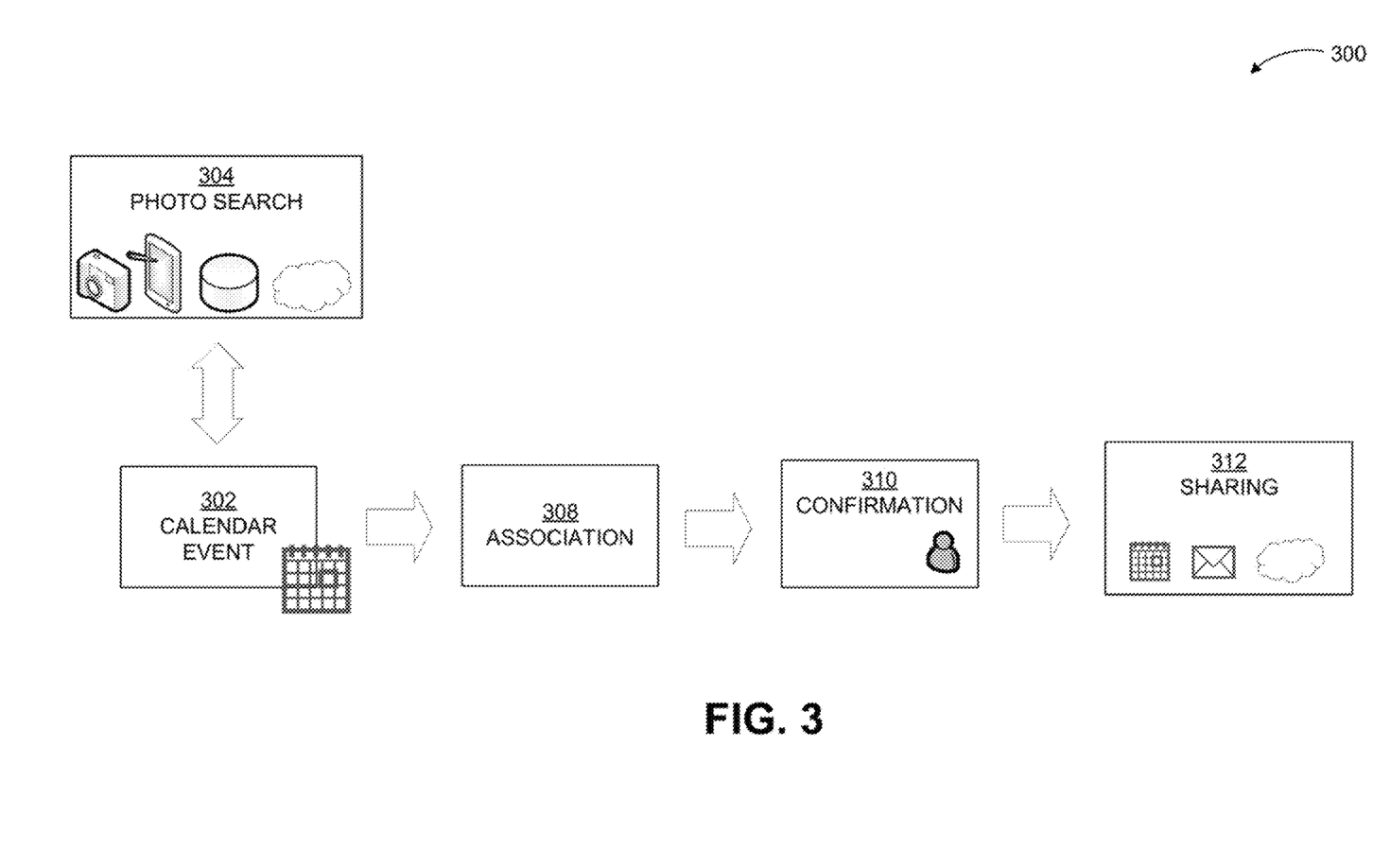
FIG. 3 includes a display diagram illustrating conceptually another example set of actions and components for automatic association and sharing of photos with calendar events.

FIG. 3 includes a display diagram illustrating conceptually another example set of actions and components for automatic association and sharing of photos with calendar events.

Diagram 300 illustrates a similar but slightly varied process compared to the one in FIG. 2. In the example configuration of diagram 300, photo search 304 may be performed concurrently with the creation of the calendar event 302. For example, an organizer may input a subject, a time, and participants of a meeting. The system may begin and continue the search as the information about the meeting is received such that in real time or shortly after the calendar event is created, photos may be presented for selection and sharing. In some cases, a second search may be performed upon conclusion of the meeting to complement the earlier results. Additional content created during the meeting, additional participants, etc. may be used to discover and associate (308) additional content.

Similarly to the process in FIG. 2, discovered content may be shared (312) with other users (e.g., participants of the meeting) upon confirmation 310 by the user (e.g., organizer). Attributes of the photos, for use in search and association, may be determined from metadata associated with each photo or another source such as the resource from which the photo is retrieved, a database, etc. The attribute of each photo may include a location of capture, a date of capture, a type of photo, and/or a storage location. In some examples, the attribute(s) of selected content (photos) and other relevant information may be provided as caption associated with the selected content. Attribute(s) of photos (or other content) may also be obtained from an analysis of the photos including, but not limited to, optical character recognition, object recognition, facial recognition, and combinations thereof.

Figure 4A:
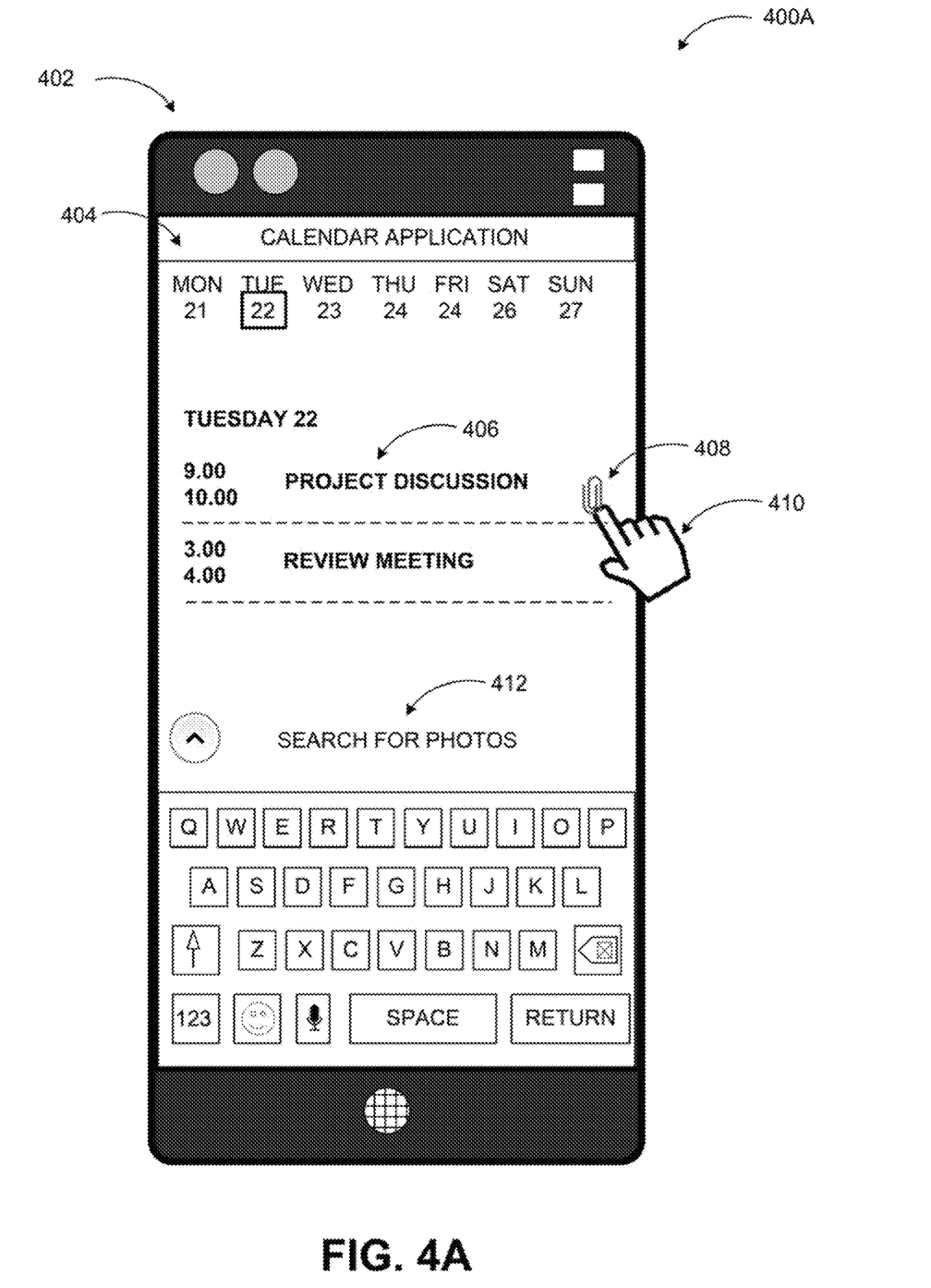
FIGS. 4A and 4B include display diagrams illustrating example user interfaces for sharing of photos automatically associated with calendar events through email.
Figure 4B:
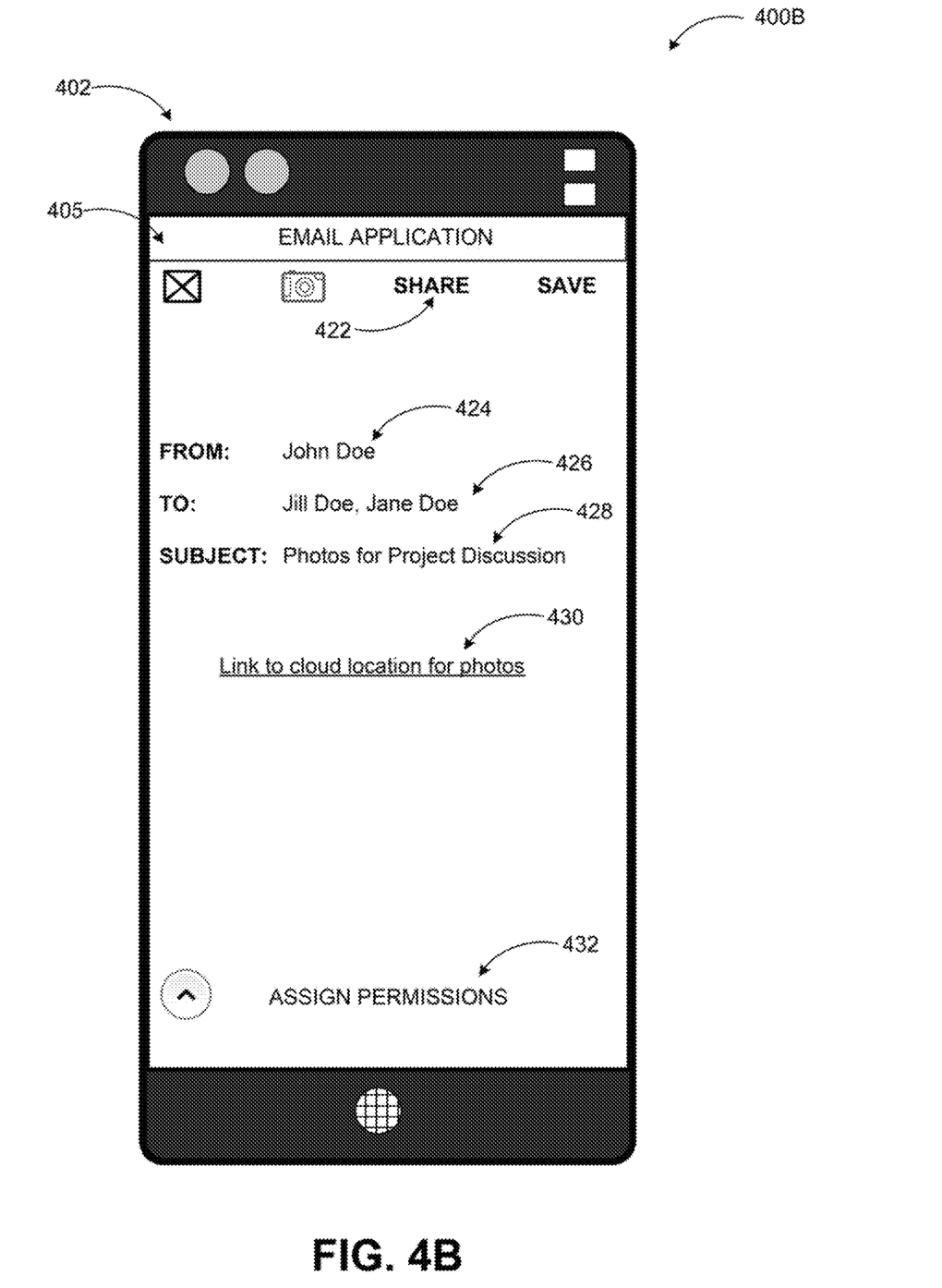

FIGS. 4A and 4B include display diagrams illustrating example user interfaces for sharing of photos automatically associated with calendar events through email.

Diagrams 400A and 400B show successive user interfaces I an example selection and sharing of content in conjunction with a calendar event. In diagram 400A, a mobile device 402 is shown with a calendar application user interface 404. The user interface may display calendar events on a particular day such as a "Project Discussion" meeting 406. The user interface may also indicate visually availability of content through an icon 408. The icon 408 may indicate that a search and association process has already been performed, and content is available for that particular calendar event.

In some examples, a control element or link 412 may be provided to initiate the search and association process. Upon selection/activation 410 of the icon 408 by a user, the user interface may transition to a sharing mode. In the example configuration of diagram 400B, the sharing mode is email. Thus, an email user interface 405 is displayed. Sender 424 and Recipients 426 fields of an email may be automatically populated (sender being the organizer of the meeting and recipients being the participants, for example). A subject 428 of the email may also be automatically used from the calendar event. User (e.g., organizer) may be allowed to edit and change any of the fields.

A link 430 to the found and selected photos (or other content) may be inserted into the email to allow the recipients access the photos. In other examples, a text message with a link to the photos may be transmitted, the photos may be stored in a shared cloud storage location, and/or the photos may be saved in the calendar event and accessed through the calendar application user interface.

In further examples, a control element or link 432 may be provided to allow the sharing user (e.g., the organizer) to set permissions in conjunction with the shared photos or other content. For example, the user may allow access to the photos for a limited period of time, a limited number of times. The user may also restrict further sharing of the photos (forwarding) or editing capabilities.

Figure 5:
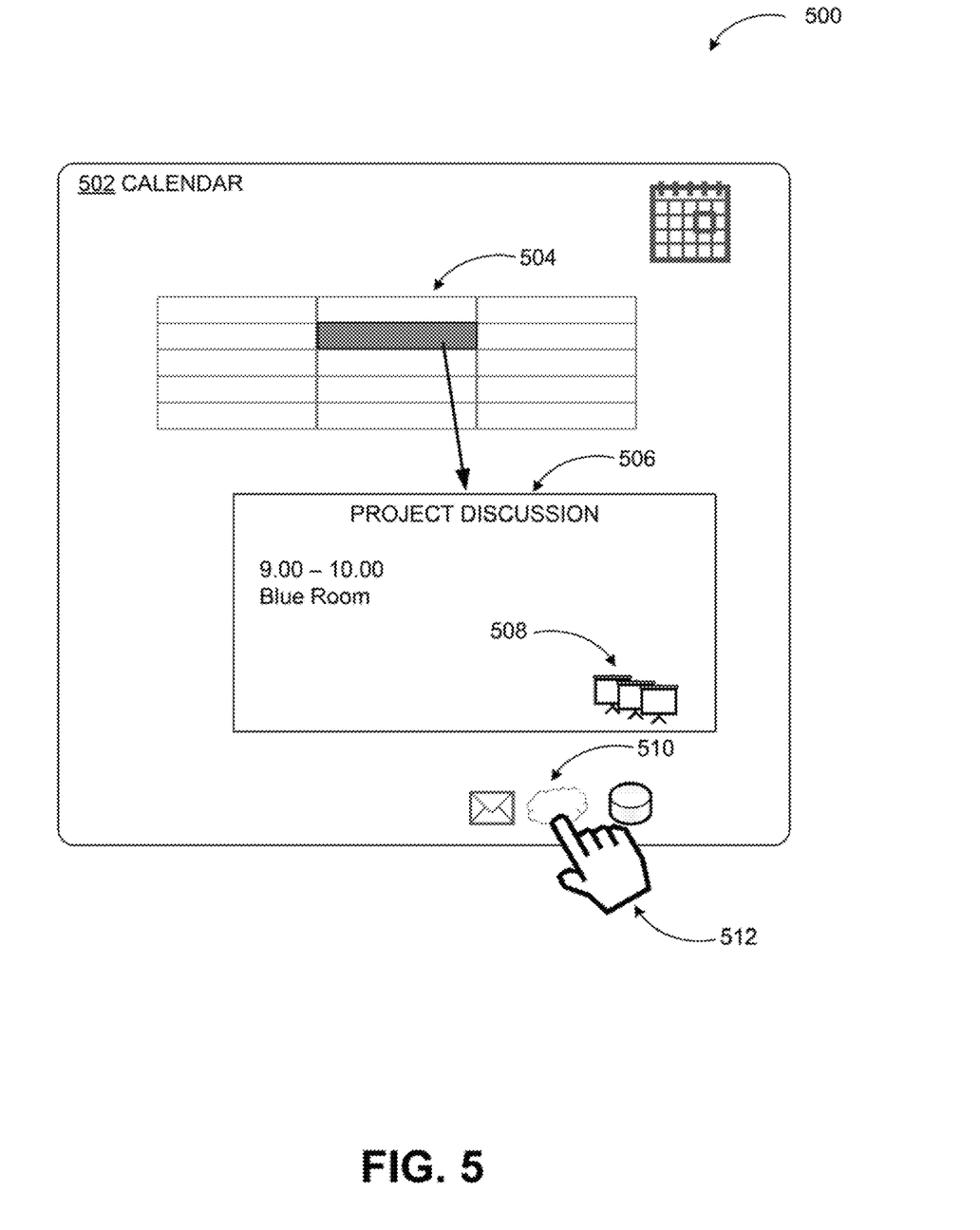
FIG. 5 includes a display diagram illustrating an example user interface for sharing of photos automatically associated with calendar events through multiple options.

FIG. 5 includes a display diagram illustrating an example user interface for sharing of photos automatically associated with calendar events through multiple options.

Diagram 500 shows an illustrative example of a calendar application user interface 502. The user interface may include a calendar view 504 with days of the week, for example. A selected event such as "Project Discussion" meeting 506 may be displayed in more detail with is timing, location, and title. The detailed display of the event ("Project Discussion" meeting 506) may also include representations of associated content 508, which may be discovered through the various processes discussed herein.

The calendar application user interface 502 may further include control elements 510 providing a user different options to share the associated content 508. The user may select (510) among email, cloud sharing, or specific storage location (e.g., an enterprise data store or a personal data store). Selected content may then be provided to recipients (e.g., participants of the meeting) through the selected method.

The examples provided in FIGS. 1A through 5 are illustrated with specific systems, services, applications, and user interface displays. Embodiments are not limited to environments according to these examples. Automatic association and sharing of photos with calendar events may be implemented in environments employing fewer or additional systems, services, applications, and user interface displays. Furthermore, the example systems, services, applications, and user interface displays shown in FIGS. 1A through 5 may be implemented in a similar manner with other user interface or action flow sequences using the principles described herein.

Figure 6:
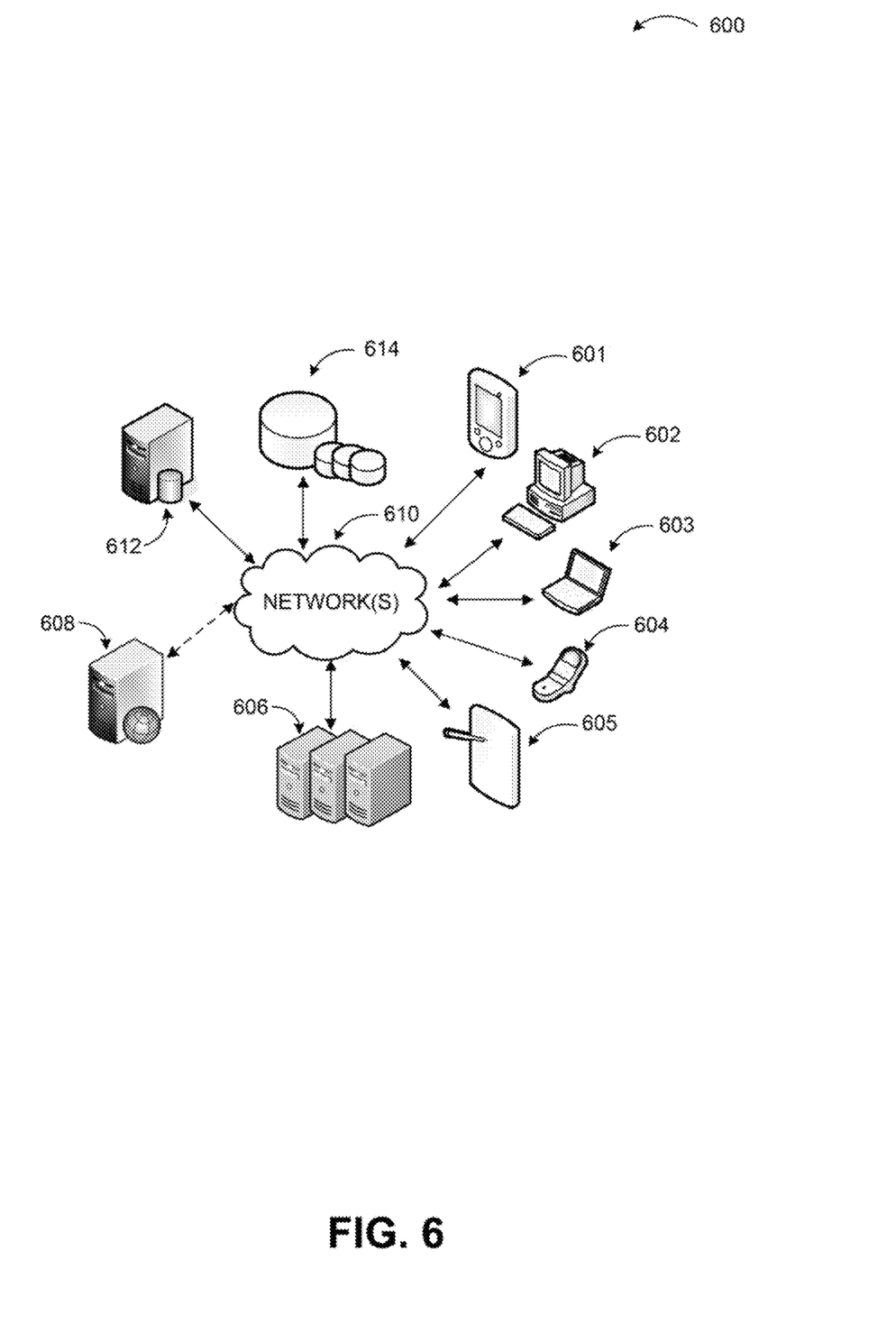
FIG. 6 is a networked environment, where a system according to embodiments may be implemented.

FIG. 6 is a networked environment, where a system according to embodiments may be implemented. Automatic association and sharing of photos with calendar events as described herein may be employed in conjunction with hosted applications and services (for example, the calendar application 124 associated with the productivity service 114, the client application 106 associated with the productivity service 114, various other applications associated with the productivity service 114, content management application 118) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or client application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared, and other wireless media.

Many other configurations of computing devices, applications, engines, data sources, and data distribution systems may be employed to implement automatic association and sharing of photos with calendar events. Furthermore, the networked environments discussed in FIG. 6 are for illustration purposes only. Embodiments are not limited to the example applications, engines, or processes.

Figure 7:
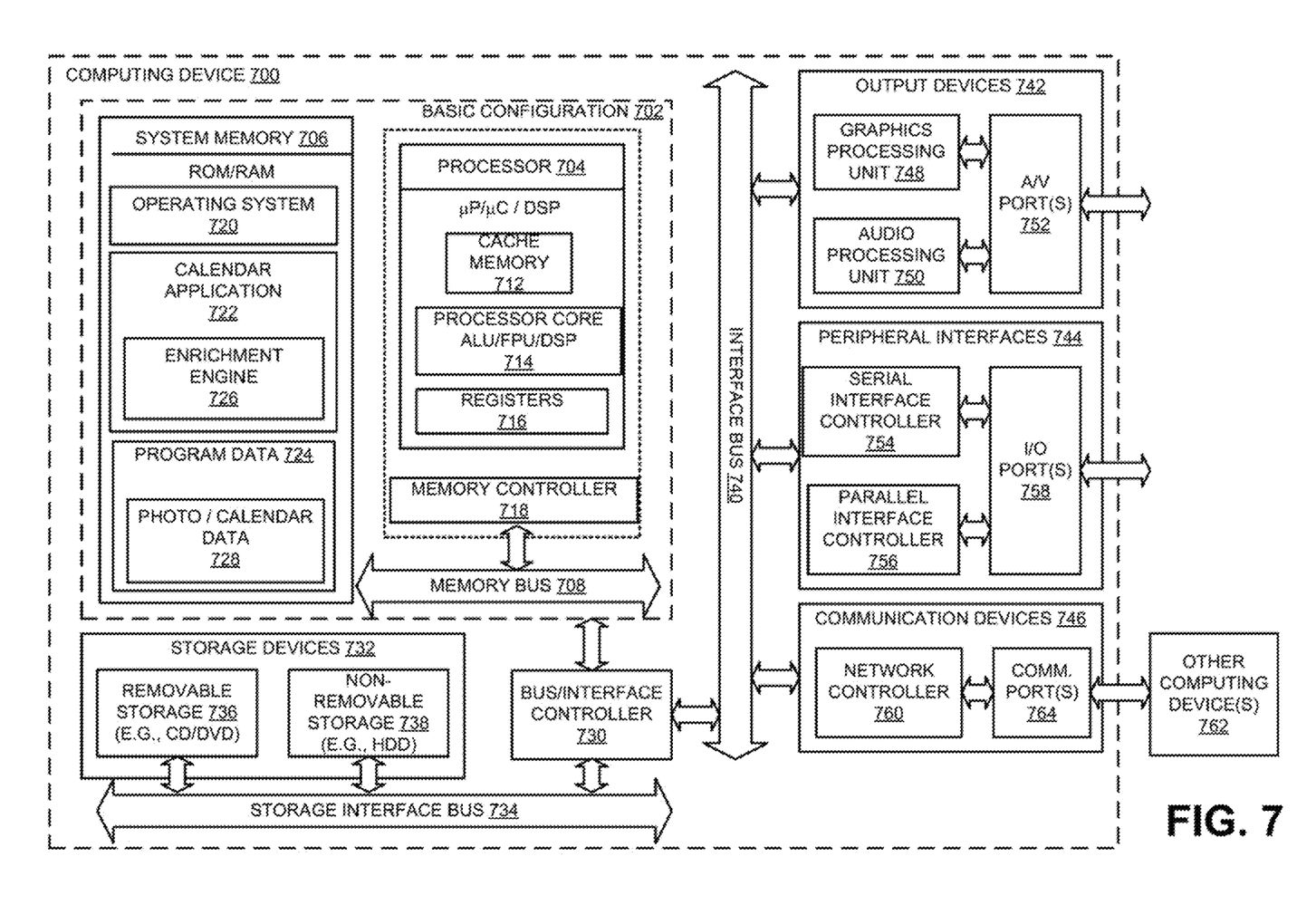
FIG. 7 is a block diagram of an example computing device, which may be used for automatic association and sharing of photos with calendar events.

FIG. 7 is a block diagram of an example computing device, which may be used for automatic association and sharing of photos with calendar events.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a calendar application 722, and program data 724. The calendar application 722 may include an enrichment engine 726, which may be an integrated module of the calendar application 722. The enrichment engine 726 may be configured to search through one or more resources for photos associated with a calendar event based on an attribute of each photo and an attribute of the calendar event. Candidate photos may be presented to a user for confirmation and selection through the calendar application 722. Upon receiving selection and confirmation of one or more photos from the candidate photos, the one or more photos may be made available to a group of users within a context of the calendar event. The program data 724 may include, among other data, photo and calendar data 728, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more oilier computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to implement automatic association and sharing of photos with calendar events. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
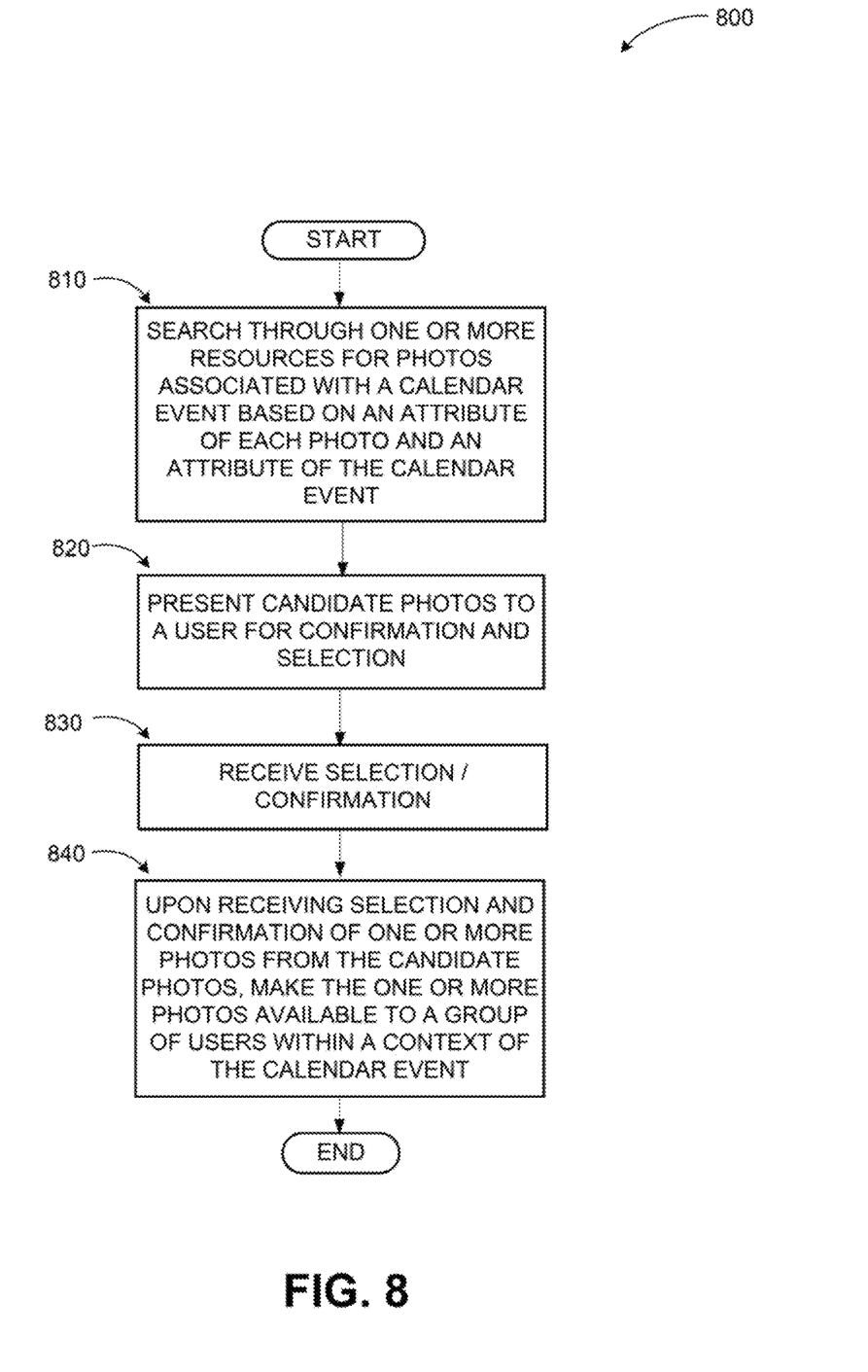
FIG. 8 illustrates a logic flow diagram of a method to implement automatic association and sharing of photos with calendar events, arranged in accordance with at least some embodiments described herein.

FIG. 8 illustrates a logic flow diagram of a method to implement automatic association and sharing of photos with calendar events.

Process 800 may be implemented on a computing device, server, or other system. An example server configured to execute an enrichment engine associated with a calendar application may comprise a communication interface to facilitate communication between the server and one or more client devices. The example server may also comprise a memory to store instructions, and one or more processors coupled to the memory. The processors, in conjunction with the instructions stored on the memory, may be configured to provide automatic association and sharing of photos with calendar events.

Process 800 begins with operation 810, where the processors may be configured to search through one or more resources for photos associated with a calendar event based on an attribute of each photo and an attribute of the calendar event. At operation 820, the processors may be configured to present candidate photos to a user for confirmation and selection. The user may be an organizer of a meeting, for example. At operation 830, the processors may be configured to make the one or more photos available to a group of users within a context of the calendar event upon receiving selection and confirmation of one or more photos from the candidate photos. The group of users may be participants of the meeting, for example.

The operations included in process 800 are for illustration purposes. Providing automatic association and sharing of photos with calendar events may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for implementing automatic association and sharing of photos with calendar events is described. The means may include a means for searching through one or more resources for photos associated with a calendar event based on an attribute of each photo and an attribute of the calendar event; a means for presenting candidate photos to a user for confirmation and selection; and a means for making the one or more photos available to a group of users within a context of the calendar event upon receiving selection and confirmation of one or more photos from the candidate photos.

According to some examples, a method to implement automatic association and sharing of photos with calendar events is described. The method may include searching through one or more resources for photos associated with a calendar event based on an attribute of each photo and an attribute of the calendar event; presenting candidate photos to a user for confirmation and selection; and upon receiving selection and confirmation of one or more photos from the candidate photos, making the one or more photos available to a group of users within a context of the calendar event.

According to other examples, the method may also include determining the attribute of each photo from metadata associated with each photo or determining the attribute of each photo from a resource associated with each photo. The attribute of each photo may include one or more of a location of capture, a date of capture, a type of photo, and a storage location. The attribute of the calendar event may include one or more of a type of the calendar event, a location of the calendar event, a date of the calendar event, a time of the calendar event, a number of participants of the calendar event, and an identity of the participants of the calendar event. Searching through the one or more resources for the photos associated with the calendar event may include searching through the one or more resources for the photos while the calendar event is being created.

According to further examples, searching through the one or more resources for the photos associated with the calendar event may include opening an existing calendar event; and searching through the one or more resources for the photos for the existing calendar event. Presenting the candidate photos to the user for confirmation and selection may include presenting an option to select a sharing method of the one or more selected photos with the group of users. The sharing method may include one or more of transmitting an email, transmitting a text message, providing a shared cloud storage location, and saving the photos in the calendar event. The one or more resources may include a cloud storage, an enterprise storage, a local storage associated with the user, and a photo capture device associated with the user.

According to other examples, a server configured to implement automatic association and sharing of content with calendar events is described. The server may include a communication interface configured to facilitate communication between the server, another server, and one or more client devices; a memory configured to store instructions; and one or more processors coupled to the communication interface and the memory. The one or more processors may be configured to search through one or more resources for content associated with a calendar event based on an attribute of the content and an attribute of the calendar event; present the content to a user for continuation and selection; receive selection and confirmation of the content; and provide an option to the user to share the content with a group of users within a context of the calendar event.

According to some examples, the one or more processors may be further configured to provide the attribute of the content as caption associated with the content. The content may include a video file, a photo, an audio file, or a graphic. The one or more processors may be further configured to analyze the content to determine the attribute of the content. The analysis may include one or more of optical character recognition, object recognition, and facial recognition. The user may be an organizer of a meeting and the group of users may be a group of participants in the meeting. The one or more processors may be further configured to provide one or more of a category and a source of the content as caption associated with the content.

According to further examples, a system configured to implement automatic association and sharing of content with calendar events is described. The system may include a first server configured to host a content management application; a second server configured to host a calendar application. The second server may include a communication interface configured to facilitate communication between the first server, the second server, and a client device; a memory configured to store instructions; and one or more processors coupled to the communication interface and the memory, the one or more processors configured to execute an enrichment engine integrated into the calendar application. The enrichment engine may be configured to search through one or more resources for content associated with a calendar event based on an attribute of the content and an attribute of the calendar event; present the content to a user for confirmation and selection; receive selection and confirmation of the content; provide an option to the user to share the content with a group of users within a context of the calendar event; and engage one or more of the calendar application, a communication application, and a cloud storage application to share the content with the group of users based on a selection of the option.

According to yet other examples, the enrichment engine may be further configured to access one or more of a local storage, a capture device, and a cloud storage associated with the user and the group of users to search for the content. The enrichment engine may be configured to search for the content for a plurality of existing calendar events upon receiving an instruction from the user.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method implemented by one or more processors executing an application for automatically associating one or more photos with calendar events, the method comprising:
concurrently with creation, via a calendar application, of a new calendar event sharable over a network with a group of users:
identifying a first attribute of the calendar event;
accessing a plurality of photos stored in a digitally accessible resource;
identifying a candidate photo included in the plurality of photos based on a comparison of the first attribute of the calendar event to a second attribute of each of the plurality of photos, the second attribute of each of the plurality of photos based on metadata or content of one of the plurality of photos; and
presenting, in real time with the creation of the new calendar event within the calendar application, the candidate photo to a user via a user interface within the calendar application; and
upon receiving confirmation of the candidate photo, making the candidate photo available to the group of users by saving the candidate photo in the new calendar event.

2. The method of claim 1, further comprising:
determining the second attribute of the candidate photo from metadata associated with the candidate photo.

3. The method of claim 1, further comprising:
retrieving the second attribute of the candidate photo from a digitally accessible resource associated with the candidate photo.

4. The method of claim 1, wherein the second attribute of the candidate photo includes one of a location of capture, a date of capture, a type of photo, and a storage location.

5. The method of claim 1, wherein the first attribute of the calendar event includes one of a type of the calendar event, a location of the calendar event, a date of the calendar event, a time of the calendar event, a number of users in the group of users, and an identity of a user in the group of users.

6. The method of claim 1, wherein identifying the candidate photo comprises:
searching through the digitally accessible resource for the candidate photo in response to the calendar event being created and before the calendar event is transmitted to the group of users over the network.

7. The method of claim 1, further comprising:
opening an existing calendar event; and
searching through the digitally accessible resource for at least one candidate photo for the existing calendar event.

8. The method of claim 1, wherein presenting the candidate photo to the user via the user interface within the calendar application comprises:
presenting an option to select a sharing method of the candidate photo with the group of users.

9. The method of claim 1, wherein the digitally accessible resource includes one of a cloud storage, an enterprise storage, a local storage associated with the user, and a photo capture device associated with the user.

10. A server comprising:
a memory configured to store instructions; and
one or more processors coupled to the memory, the one or more processors configured, via execution of the instructions, to:

concurrently with creation, via a calendar application, of a new calendar event sharable over a network with a group of users:
  identify a first attribute of the calendar event;
  access content stored in a digitally accessible resource;
  identify candidate content included in the content stored in the digitally accessible resource based on a comparison of the first attribute of the calendar event to a second attribute of each of the content, the second attribute of each of the plurality of photos based on metadata of the content; and
  present, in real time with the creation of the new calendar event within the calendar application, the candidate content to a user via a user interface within the calendar application; and
in response to upon receiving confirmation of the candidate content, provide an option to the user to share the candidate content with the group of users by saving the candidate photo in the new calendar event.

11. The server of claim 10, wherein the second attribute of the candidate content is a caption associated with the candidate content.

12. The server of claim 10, wherein the candidate content includes one of a video file, a photo, an audio file, and a graphic.

13. The server of claim 10, wherein the one or more processors are further configured to analyze the candidate content to determine the second attribute of the content.

14. The server of claim 13, wherein the one or more processors are configured to analyze the candidate content by performing one of optical character recognition and object recognition.

15. The server of claim 10, wherein the calendar event is a meeting, the user is an organizer of the meeting, and the group of users is a group of participants in the meeting.

16. The server of claim 10, wherein the one or more processors are further configured to determine one of a category and a source of the candidate content from a caption associated with the candidate content.

17. A system comprising:
  a memory configured to store instructions; and
  one or more processors coupled to the memory, the one or more processors configured, via execution of the instructions, to:
    identify a first attribute of an existing calendar event shared over a network with a group of users;
    access a plurality of photos stored in a digitally accessible resource;
    identify a candidate photo included in the plurality of photos based on a comparison of the first attribute of the calendar event to a second attribute of each of the plurality of photos,
    wherein the second attribute of each of the plurality of photos based on metadata or content of one of the plurality of photos, and wherein the second attribute is obtained using at least one selected from a group consisting of optical character recognition, object recognition, and facial recognition;
    add an icon to a user interface of a calendar application displaying the calendar event, the icon indicating the availability of the candidate photo; and
    to upon receiving a selection of a control element from a plurality of control elements included within the user interface, provide the candidate photo to the group of users.

18. The system of claim 17, wherein the one or more processors are further configured, via execution of the instructions, to receive, via the user interface, one or more permissions related to the candidate photo.

19. The system of claim 18, wherein the one or more permissions include at least one of allowing access to the candidate photo for a limited period of time, allowing access to the candidate photo for a limited number of times, restricting forwarding of the candidate photo, and restricting editing of the candidate photo.

* * * * *